Aug. 20, 1929.  W. H. KIRBY  1,725,644
ROAD FINDER
Filed April 5, 1927   3 Sheets-Sheet 1
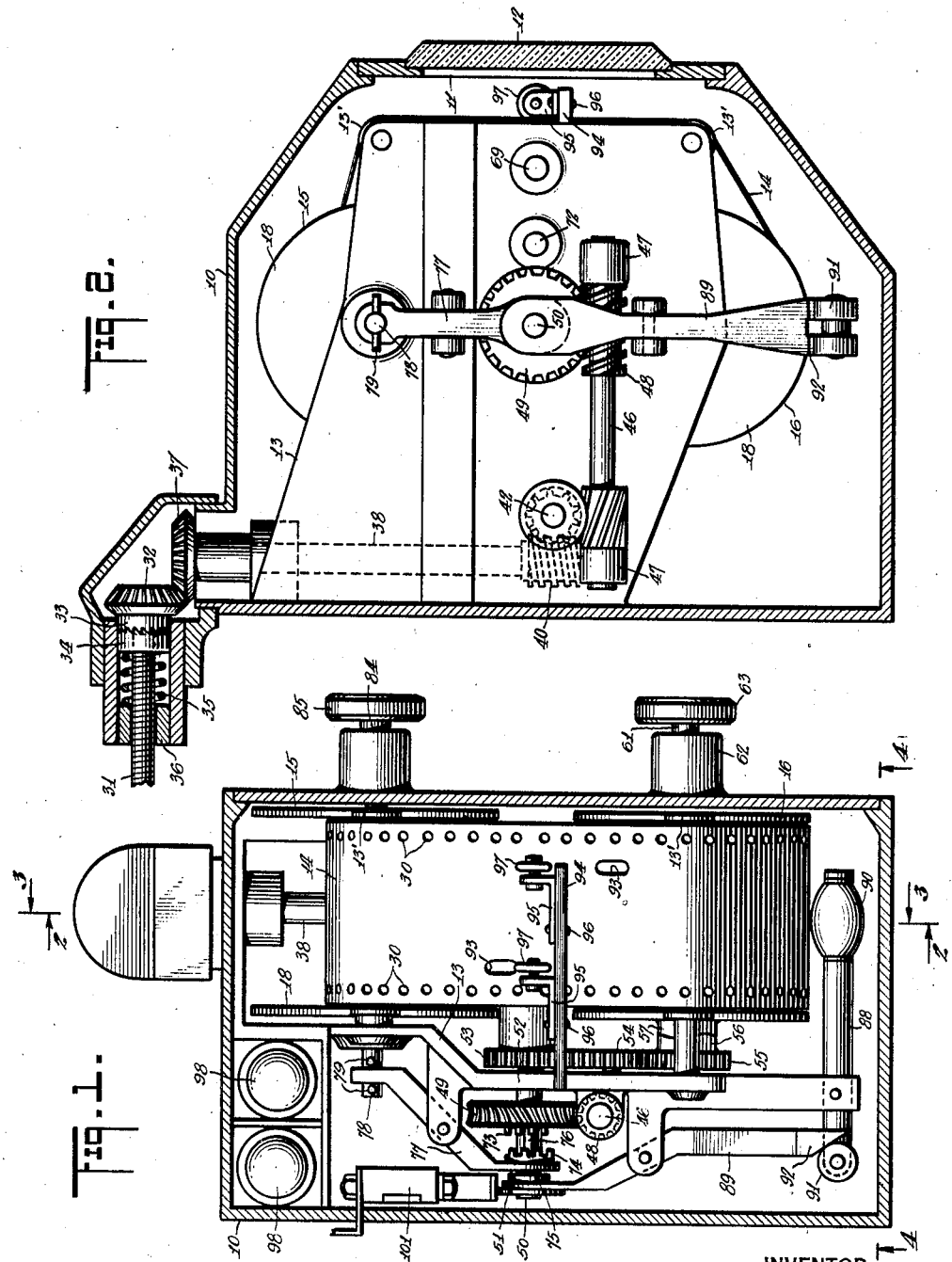
WITNESSES
INVENTOR
William H. Kirby
BY
ATTORNEY

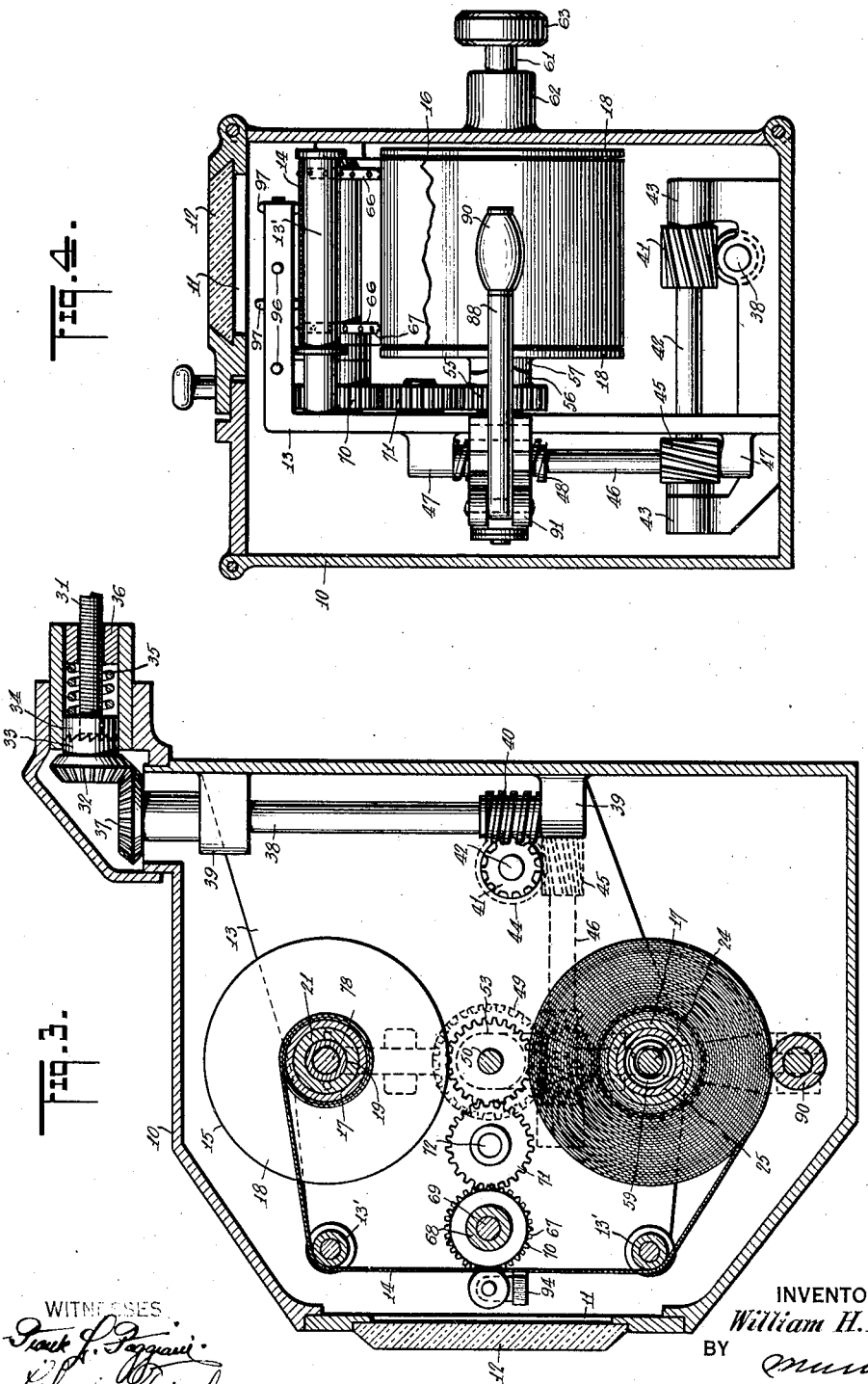

Aug. 20, 1929.  W. H. KIRBY  1,725,644
ROAD FINDER
Filed April 5, 1927  3 Sheets-Sheet 3
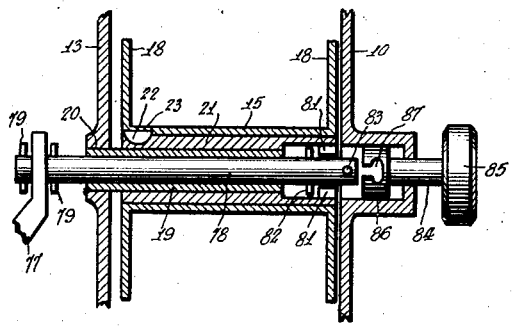
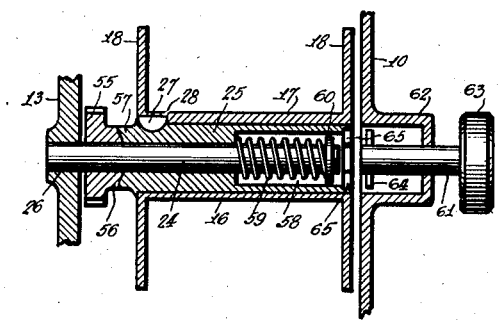
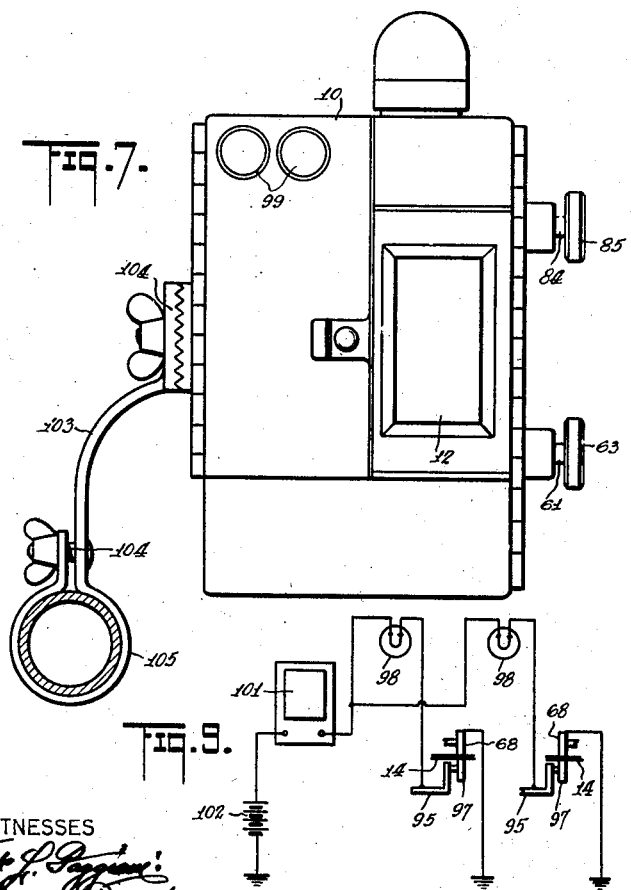
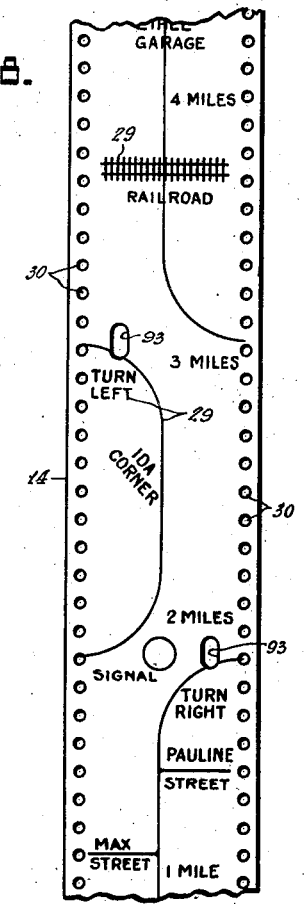
WITNESSES
INVENTOR
William H. Kirby.
BY
ATTORNEY Patented Aug. 20, 1929.

1,725,644

UNITED STATES PATENT OFFICE.

WILLIAM H. KIRBY, OF BEVERLY, MASSACHUSETTS.

ROAD FINDER.

Application filed April 5, 1927. Serial No. 181,146.

This invention relates to the class of devices for an automobile to guide the operator along a strange road about to be traveled.

The principal object of the present invention is to provide a device of the indicated character which will give to an operator of an automobile traveling over a strange road, the "right" and "left" turns, at or about the time they are to be made, the condition of the road being traveled, location of garages, hotels, side streets, and such other information necessary for guiding the operator; also the mileage and so arranged that the operator may know enough time in advance of certain conditions to be encountered thereby giving to the operator the opportunity of determining in advance the best course to be pursued. In accordance with this object of the invention the device of the present invention will be adapted for connection with the usual speedometer gearing so that the device will operate in timed accord with the distance to be traveled.

Another object of the invention is the provision in a device of the indicated character to signaling means which operates to indicate "right" and "left" turns at or about the time they should be made.

With the foregoing and other objects in view, the invention resides in the particular combination and operation of the parts hereinafter described.

The nature of the invention and its distinguishing features and advantages will appear when the following specification is read in connection with the accompanying drawing, in which—

Figure 1 is a sectional elevation illustrating certain features of the present invention.

Fig. 2 is a sectional elevation, the section being taken on the line 2—2 of Fig. 1 and looking in the direction indicated by the arrows.

Fig. 3 is a sectional elevation, the section being taken on the line 3—3 of Fig. 1, looking in the direction indicated by the arrows.

Fig. 4 is a sectional elevation, the section being taken on the line 4—4 of Fig. 1, and looking in the direction indicated by the arrows.

Fig. 5 is a sectional view through the pay-out reel or spool and operating parts associated therewith.

Fig. 6 is a sectional view through the take-up reel or spool, showing parts associated therewith.

Fig. 7 is a plan view.

Fig. 8 is an elevation of a portion of the tape and illustrating the manner in which the indicia are mapped or charted.

Fig. 9 is a diagrammatic view of the signaling means.

Referring now more particularly to the several views of the drawing it will be apparent that the device of the present invention will include a housing or casing 10 having a sight opening 11 over which is arranged a glass 12. Arranged within the casing 10 is a bearing frame 13. In order to properly support an indicia bearing tape 14 so that a portion thereof will traverse the sight opening 11 there are provided reels or spools 15 and 16; the former being a pay-out spool and the latter being a take-up spool. These spools are similar in construction. In the present instance each of the spools comprises a hub 17 and side flanges 18. The spool 15 is rotatably mounted on a tubular shaft or spindle 19 secured at one end to a portion of the frame 13 as at 20. A tubular member 21 surrounds the spindle 19 and is rotatable thereon. The tubular member 21 has a key 22 adapted to be disposed in a recess 23 in one end of the hub 17 of the spool 15. In this way the spool 15 is detachably associated with the tubular member 21. The spool 16 is rotatably mounted on a shaft or spindle 24 by virtue of the use of a tubular member 25 arranged on the spindle 24. One end of the spindle 24 is secured to a portion of the frame 13 as at 26. The tubular member 25 has a key 27 adapted to enter a recess 28 in one end of the hub 17 of the spool 16 to frictionally associate the spool 16 with the member 25 to detachably connect the spool 16 thereto. The spools 15 and 16 may be used interchangeably on the spindles 19 and 24.

The tape 14 will have charted, mapped or plotted thereon divers indicia of a particular route or road so as to be useful to indicate to an operator of an automobile information which will serve as a guide to aid and facilitate the operator in negotiating a particular point. In Fig. 8 there is shown a portion of a type of tape to be used which may be made of any preferred material. The tape has printed thereon in the present instance indicia 29 which will be of the necessary range to cover the mainland marks, side streets, etc., and which will indicate "right" and "left" turns, and which will also give the miles traveled. The tape 14 at each side edge has holes 30 spaced equi-distantly for a purpose to appear. The tape 14 is adapted to be wound on the spool 15 from which it will be payed out and to be taken up by the spool 16. The spools 15 and 16 each serve as a pay-out spool and a take-up spool, but in describing the operation it is deemed advisable to refer to one spool as a pay-out spool and the other as a take-up spool.

In order to cause the positive rotation of the take-up spool 16, and to cause the positive movement of the tape 14, there is provided mechanism presently to be described. A flexible shaft 31 has one end thereof operatively connected with the gear of a speedometer so as to be rotated thereby. This flexible shaft 31 is encased in a suitable housing which extends through the floorboard of the automobile. The end of the shaft 31 entering the housing has loosely connected thereto a bevel gear 32. This gear 32 has a clutch member 33 which coacts with a clutch member 34 loosely keyed to the shaft 31, and a spring 35 serves for maintaining the coacting relationship of the clutch members 33 and 34. One end of the spring 35 is in engagement with a bushing 36 and the opposite end thereof is in engagement with the clutch member 34. It will now be understood that when the shaft is rotating with the automobile traveling forwardly, the gear 32 will be rotating, and when the automobile is backing, the clutch members 33 and 34 will function to allow the gear 32 to stop rotating. The bevel gear 32 meshes with a bevel gear 37 on one end of a shaft 38 rotatably mounted in bearings 39 on one wall of the casing. The shaft 38 has a worm 40 which meshes with a worm gear 41 on a shaft 42. The shaft 42 has the opposite ends thereof respectively journaled in bearings 43 carried by the frame 13. The shaft 42 has fixed thereto a worm gear 44 which meshes with a similar gear 45 fixed to a shaft 46. The opposite ends of the shaft 46 are respectively journaled in bearings 47 carried by the frame 13. The shaft 46 has fixed thereto a worm 48 which meshes with a worm gear 49 loose on a shaft 50. The opposite ends of the shaft 50 are respectively journaled in bearings 51 and 52. The shaft 50 has fixed thereto a gear 53 which meshes with an idler gear 54, and the latter meshes with a gear 55 loosely mounted on the spindle 24. A clutch is arranged between the gear 55 and the tubular member 25. This clutch consists of cam portions 56 on the gear 55 which coact with cam portions 57 on one end of the member 25. The member 25 has a bore 58 opening through one end thereof. A coil spring 59 surrounds the portion of the spindle 24 which extends into the bore 58. One end of the spring 59 is in engagement with the member 25, and the opposite end thereof is in engagement with a collar or the like 60 secured to the spindle 24. The spring 59 serves to maintain the yieldable coaction of the cam portions 56 and 57, and allows the spool 16 to be rotated independently, or in other words, not as the result of the rotation of the gear 55. A stub shaft 61 is slidable in a bearing 62 on one side wall of the casing 10, and a knob 63 is arranged on the outer end of the shaft. The inner end of the shaft 61 carries a pin 64. The pin 64 extends transversely with portions thereof disposed diametrically opposite each other and engageable in notches 65 in the end of the member 25 adjacent thereto. By pushing on the knob 63 the end portions of the pin 64 may be entered into the notches 65. Then when the knob is turned in either direction, the spool 16 will also be turned; the cam portions 56 riding or slipping on the cam portions 57. The tape 14 is moved positively by wheels 66 each of which has pins 67 radially disposed on the circumferential edge of the wheel. One wheel 66 is arranged so that its pins will move into and out of the holes 30 along one edge of the tape 14 in the rotation of the wheel. The wheels 66 are secured to a tubular shaft 68 which surrounds a shaft 69 whose opposite ends respectively are journaled in bearings in portions of the frame 13. A gear 70 is fixed to the shaft 68, and said gear 70 meshes with an idler gear 71 rotatable on a stub shaft 72 carried by a portion of the frame 13, and said gear 71 meshes with the gear 53 of shaft 50. It will now be understood that when worm gear 49 is rotating that motion will be transmitted to the gear 55, through and by virtue of the intervention of shaft 50, gears 53 and 54; and that motion will be transmitted to the spool 16 by virtue of the clutch between the gear 55 and the member 25 which is keyed to the spool 16. It will also be apparent that when the worm gear 49 is rotating, the wheels 66 will be rotated, through and by virtue of the intervention of the gears 70 and 71, causing the pins to engage portions of the tape by virtue of the holes 30 to positively move the tape in one direction toward the spool 16.

In order to allow the shaft 50 to rotate continuously without driving the spool 16 and the tape 14, there is provided a clutch consisting of teeth 73 on one side of the gear 49 and teeth 74 on a member 75 slidable on the shaft 50 but caused to rotate therewith by virtue of a key 76 secured to the shaft 50. A lever 77 is employed, one end of which loosely carries the clutch member 75, and the opposite end thereof has a hole which accommodates one end of a shaft 78 slidably mounted in the tubular shaft 19. Pins 79 extend transversely through the shaft 78 respectively at opposite sides of the end of the lever. The tubular member 21 has a bore 80 in one end thereof. Lugs 81 extend radially inward from the wall of the bore 80 diametrically opposite each other. The shaft 78 has a pin 82 extending transversely therethrough, and a pin 83 also extends transversely therethrough, but at a right angle with respect to the pin 82. A stub shaft 84 is slidable in a bearing on one side wall of the casing 10, and said stub shaft 84 has a knob 85 on the outer end thereof and a head 86 on the inner end thereof. The head has a T-shaped slot 87. When it is desired to turn the spool 15, and at the same time to stop the movement of the take-up spool 16, and the positive movement of the tape 14 by the wheels 66, the pin 83 is engaged in the slot 87 by pressing on the knob 85. The knob 85 is then pulled in an opposite direction, and as a result the lever 77 will be moved to disengage the teeth 74 from the teeth 73, and the pin 82 will be brought to a position to coact with the lugs 81. By turning on the knob 85 the spool 15 may be turned to any desired extent to move the tape 14, since the spool 16 will not be rotating.

In order to stop the rotation of the spool 16 and the pin wheels 66 when the spool 16 has wrapped thereon a predetermined quantity of the tape, there are provided levers 88 and 89, both being carried by the frame 13. The lever 88 has a roller 90 at one end thereof, and a roller 91 at the opposite end thereof. The roller 91 coacts with a cam portion 92 on one end of the lever 89, and the opposite end of the lever 89 is connected with the clutch member 75. It will now be understood that while tape 14 is wound on the take-up spool 16, there comes a time when the outermost convolution will contact with the roller 90. This will cause the lever 88 to operate to cause the roller 91 to coact with the cam 92. This coaction of the roller 91 with the cam 92 will operate the lever 89 and as a consequence the clutch member 75 will be retracted to an inactive position as shown most clearly in Fig. 1.

In order to notify the operator of the automobile of a turn in the road, and so that the operator does not have to watch the tape constantly, particularly when driving at night, there is provided means presently to be described. The tape 14 will have openings or slots cut therein as at 93 at certain points in the tape with respect to the indicia or diagram indicating a "left" turn or a "right" turn. Mounted on an insulator 94 carried by a portion of the frame 13 are members 95 of angular construction and made of conducting material. Each of the members 95 is pivotally connected as at 96 with the insulator 94 by the use of a binding screw. Each member 95 carries a contact roller 97, the same being electrically connected with the member. Each roller 97 is adapted to register with slots 93 at its related side edge of the tape 14. The rollers 97 will be disposed at one side of the tape 14 and are adapted to coact with the shaft 68. There are provided electric lamps 98. One lamp 98 is arranged adjacent a red glass 99 indicating a "left" turn, and the other lamp 98 is arranged adjacent a green glass 100 indicating a "right" turn. These glasses 99 and 100 are arranged respectively in openings in the casing 10. An electric buzzer 101 is arranged within the casing. One terminal of the buzzer 101 is electrically connected to one terminal of the lamps 98, and the other terminals of the lamps are respectively electrically connected with the members 95. The remaining terminal of the buzzer is electrically connected with a source of electrical energy 102, which in turn is connected with a suitable ground. The tubular shaft 68 is also connected to the ground so as to complete a circuit. It will now be understood that when either one of the rollers 97 is allowed to contact with the shaft 68 by virtue of the registration of one of the slots 93 with the roller 97 the circuit will be closed through one of the lamps 98, also the buzzer 101, thus notifying the operator that either a "left" or "right" turn may be made at a point beyond. In the continued movement of the tape the circuit will be opened, due to the fact that the tape will serve as an insulator between the rollers 97 and the shaft 68.

The casing 10 may be made up of parts either hingedly connected or which may be readily separated by the removal of a pin so that access may be had to the parts, particularly for changing the tape and for reversing the spools 15 and 16, in making the return trip. The casing 10 has connected therewith an arm 103 which is made adjustable with respect to the casing as at 104 and has a clamp 105 for affecting the attachment of the device to the steering column of the automobile, all of which is shown most clearly in Fig. 7.

From the foregoing it will be obvious that the device in use serves for keeping an operator of an automobile posted in advance of certain conditions along a strange road or route to be traveled, to the end, that the operator will be guided by the indicia visible through the sight opening 11 in the casing 10, as the vehicle progresses along the road or route; that means is provided to allow the automobile to reverse without operating the device; that means is provided to stop the operation of the transmission means to stop the movement of the tape whenever that is desired; that provision is made for reversing the tape for the return trip; and to make driving at night easy there is provided signaling means which notifies the operator in advance of turns to be made.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a device of the class described, a tape having road finding indicia, means mounting the tape for movement, driving means for effecting the movement of the tape in one direction, means operable for effecting the reverse movement of the tape, and control means adapted to be operated by the tape to render the driving means inactive when a determined amount of the tape has been moved in one direction by the driving means, to allow the reverse movement of the tape, said control means also adapted to be operated by the reversing means to render the driving means inactive when reversing the movement of the tape.

2. In a road finding device, the combination of a tape having road finding indicia, rotatably mounted first and second spools which support said tape for movement, driving means connected with said second spool to cause the rotation thereof, to move said tape in one direction, said driving means including a clutch; means operated by said tape when a determined amount of the tape is wound on said second spool, to operate said clutch, to prevent the driving means from rotating said second spool, separate means to rotate said first spool to move said tape in a reverse direction, and means operable by the means last mentioned to operate said clutch, to prevent the driving means from rotating said second spool, and a second clutch included in said driving means which is adapted to allow said second spool to rotate in a reverse direction.

WILLIAM H. KIRBY.